United States Patent [19]

Jüng et al.

[11] Patent Number: 4,585,818
[45] Date of Patent: Apr. 29, 1986

[54] FLAME RETARDANT POLYMETHYL METHACRYLATE MOLDING COMPOUND

[75] Inventors: Karl A. Jüng, Ober-Ramstadt; Karl-Heinz Jakob, Lampertheim; Manfred Munzer, Bensheim; Wilhelm Wopker, Bickenbach, all of Fed. Rep. of Germany

[73] Assignee: Röhm GmbH, Darmstadt, Fed. Rep. of Germany

[21] Appl. No.: 591,181

[22] Filed: Mar. 19, 1984

[30] Foreign Application Priority Data

Mar. 31, 1983 [DE] Fed. Rep. of Germany ....... 3311832

[51] Int. Cl.$^4$ .......................... C08K 5/50; C08K 5/52; C08K 3/20; C08K 5/34
[52] U.S. Cl. .................................... 524/120; 524/125; 524/126; 524/130; 524/144; 524/151; 524/351; 524/352; 524/100
[58] Field of Search ............... 524/120, 125, 126, 130, 524/144, 151, 351, 352, 100

[56] References Cited

U.S. PATENT DOCUMENTS

| | | | |
|---|---|---|---|
| 2,877,204 | 3/1959 | Duhnkrack et al. | 524/130 |
| 3,347,818 | 10/1967 | Howe | 524/144 |
| 4,046,719 | 9/1977 | Stangback et al. | 524/144 |
| 4,075,163 | 2/1978 | Hofer et al. | 524/126 |
| 4,180,498 | 12/1979 | Spirack | 524/120 |

FOREIGN PATENT DOCUMENTS

| | | |
|---|---|---|
| 1495544 | 2/1969 | Fed. Rep. of Germany . |
| 1544737 | 9/1971 | Fed. Rep. of Germany . |
| 872696 | 7/1961 | United Kingdom . |
| 996914 | 6/1965 | United Kingdom . |
| 1030802 | 5/1966 | United Kingdom . |
| 1062598 | 3/1967 | United Kingdom . |
| 1097950 | 1/1968 | United Kingdom . |
| 1100283 | 1/1968 | United Kingdom . |
| 1443982 | 7/1976 | United Kingdom . |

*Primary Examiner*—John Kight
*Assistant Examiner*—Kriellion Morgan
*Attorney, Agent, or Firm*—Curtis, Morris & Safford

[57] ABSTRACT

Flame retardant molding compounds comprising polymers of methyl methacrylate having an average molecular weight between $1 \times 10^5$ and $2 \times 10^5$, which molding compounds contain from 8 to 15 weight percent of at least one chloroalkylphosphoric acid ester of the formula

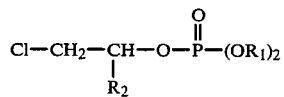

wherein $R_1$ is alkyl or

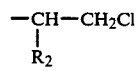

and $R_2$ is hydrogen, methyl, ethyl, or chloro-substituted methyl or ethyl.

10 Claims, No Drawings

FLAME RETARDANT POLYMETHYL METHACRYLATE MOLDING COMPOUND

The present invention relates to polymethyl methacrylate molding compounds incorporating flame retardants.

On the basis of their composition, the molding compounds of the invention may be divided into three classes, namely:

(1) Polymethyl methacrylate (PMMA) and polymers containing over 80 percent by weight of methyl methacrylate;

(2) copolymers of methyl methacrylate with significant amounts (more than 20 percent by weight) of other monomers such as styrene and alpha-methylstyrene; and (3) polymer blends and graft polymers of methyl methacrylate with soft-rubber-like, i.e. impact resistant materials.

The real polymethyl methacrylate molding compounds, which also are those used in the largest quantities, are those formed of PMMA or of copolymers of methyl methacrylate with only a few percent of lower acrylic esters. (See 1 above.) These molding compounds are essentially processed by three different methods:

(a) Compression molding, used only for special purposes and on a small scale;
(b) injection molding; and
(c) extrusion.

Extrusion makes the greatest demands on the uniformity and quality of molding compounds. With the steadily growing use of extrusion, the quality requirements to be met by molding compounds have been continually tightened.

PMMA-based molding compounds find important uses in building construction and vehicle manufacture, in the illuminating and advertising sectors, and in molded household and commercial articles. Semimanufactures which have come into wide use include double- or triple-wall panels which serve as insulating-glass substitutes (see published German patent application No. 1,609,777) and which can be produced by extrusion.

The burning behavior of articles made from PMMA molding compounds therefore is of particular importance. (See Vieweg-Esser, Kunstoff-Handbuch, vol. IX, "Polymethacrylates", Carl Hanser Verlag, Munich, 1975, pp. 400–407.)

The flame-retardant agents which are commonly used in the prior art to impart flame resistance to plastics usually belong to one of the following classes of substances:
Inorganic additives;
halogenated organic compounds;
organic phosphorus compounds; or
halogenated organic phosphorus compounds.

Until recently, the preferred flame retardant additives for acrylic resins were compounds having two or more phosphorus functions per molecule (a diphosphate of dichloroneopentyl glycol and a diphosphonate phosphate).

German patent publication No. 1,544,737 discloses a casting resin composed of (a) monomers such as vinyl compounds and acrylic compounds,
(b) a chlorine-containing polymer,
(c) a commonly used halogen and/or phosphorus-containing flameproofing substance (such as trichloroethyl phosphate) soluble in (a), and
(d) a commonly used crosslinking agent.

In said publication, it is stated that "it is important with respect to the properties of the casting resins of the invention that part of the halogen present in the mixture be in the form of a chlorine containing polymer".

A process for the production of self-extinguishing synthetic resins is known from German published patent application No. 1,495,544 wherein a mixture of at least about 5 weight percent of at last one copolymer of vinyl chloride, at least about 1.2 weight percent of phosphorus in the form of an organophosphorus compound containing P—O bonds and optionally containing halogen, preferably at least one further polymerizable monomer, and an optional crosslinking agent is polymerized. Comparative tests with polymers of a methyl methacrylate prepolymer (viscosity, 3500 cp) and trichloroethyl phosphate in a ratio of 84:15 weight percent have shown that such products are not self-extinguishing.

Polymers of vinyl chloride and methyl methacrylate, each used in an amount between 35 and 47.5 weight percent, which further contain stabilizers, glycerol, a crosslinker, and trichloroethyl phosphate are also known from USSR Pat. No. 683,210 (Chem. Abstr. 95, 170478).

The conclusion to be drawn from the prior art would be that the presence of considerable amounts of halogen containing polymers are essential to the commercial usefulness of such compositions.

The solutions proposed in the prior art to the problem of imparting flame resistance to polymer compositions are based on polymer systems of complex composition and reflect the compromise which had to be resorted to in order to obtain products which not only possess flame resistance but also have the requisite mechanical and, often, optical properties. In German patent publication No. 1,495,544, for example, it is pointed out that it is surprisingly possible to post-form the polymers by vacuum thermoforming or blow molding. As a matter of fact, the addition of flame retardant substances like halogenated organophosphorus compounds, for example almost always has an adverse effect on the quality of the plastic products which is due, for one thing, to the plasticizing action of such additives.

The consequences of this plasticizing effect are manifest also in the burning behavior of such polymers in that a relatively rapid softening of the polymers is likely.

Another factor to be taken into consideration is that the tendency of PMMA-based synthetic resins to absorb water is enhanced by the addition of halogenated phosphorus compounds, and this may also affect the mechanical and optical properties of such resins.

Thus, there have been serious objections to the use of such molding compounds in extrusion.

It has now been found that flame retardant molding compounds in accordance with the present invention fully meet commercial requirements. Such molding compounds comprise a homopolymer or copolymer of methyl methacrylate containing from 8 to 15 percent by weight of at least one chloroalkyl phosphoric acid ester of the formula

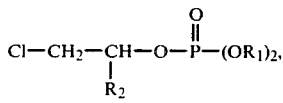

wherein R₁ is linear or branched alkyl having 1 to 4 carbon atoms or is

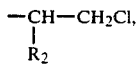

and R₂ is hydrogen, methyl, ethyl, or chloro-substituted methyl or ethyl.

Suitable chloroalkylphosphoric esters are, particularly, tris-(2-chloroethyl)phosphate and tris-(beta-chloroisopropyl)phosphate.

The molding compounds in accordance with the invention advantageously further contain chlorinated phosphoric acid esters of the formula

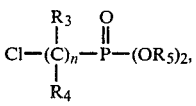

wherein R₃ and R₄ are hydrogen or chlorine, n is an integer from 1 to 3, and R₅ is hydrogen, secondary alkyl having 3 to 8 carbon atoms, or cycloalkyl having up to 8 carbon atoms, in amounts from 0.5 to 5 percent by weight of the molding compound, preferably from 1 to 3 percent by weight. Those compounds which tend to split off olefins from the molecular association, and particularly the esters of branched and cycloaliphatic alcohols, are preferred. Examples are the diisopropyl esters, neopentyl esters, cyclohexyl esters, and the like.

Moreover, the addition of known sterically hindered phenols or of known esters of trivalent phosphorus which are used mainly as peroxide decomposers has proved useful. The esters of trivalent phosphorus are compounds of the formula

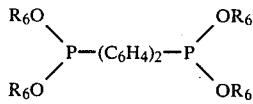

wherein R₆ is the same or different alkyl or alkylphenyl having 14 to 24 carbon atoms, or of the formula

wherein R₇ is the same or different alkylphenyl having 14 to 24 carbon atoms, or of the formula

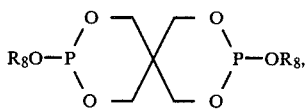

wherein R₈ is the same or different alkyl or alkylphenyl having 14 to 24 carbon atoms. The phenols and/or esters are included in amounts from 0.05 to 2 percent, preferably 0.3 to 1 percent, by weight of the molding compound. (See Ullmanns Enzyklopädie der technischen Chemie, *Verlag Chemie*, vol. 15, pp. 258–259.)

Compounds of the formula

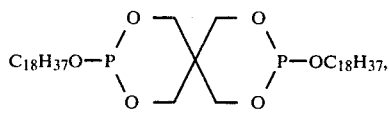

(commercially available as "WESTON 618"),

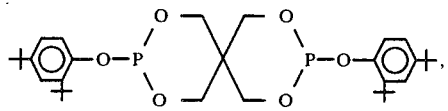

(commercially available as "WESTON MDW 626"),

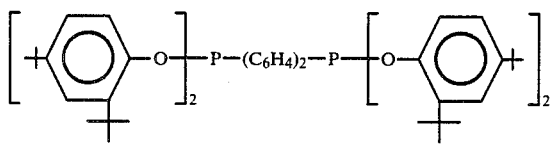

(commercially available as "SANDOSTAB P-EPQ") and

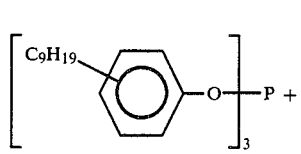

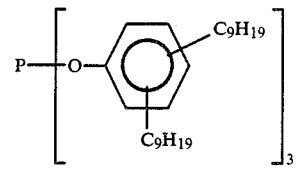

(tris-nonylphenylphosphite, TNNPP, commercially available as "NAUGARD P") are particularly suitable. The last mentioned tris-nonyl compounds are mixtures of the mononyl-substituted and dinonyl-substituted phenyl esters in all proportions, e.g. from 0.1:99 to 99.9:0.1 by weight, preferably wherein the mononyl compound predominates in a ratio from 8:1 to 30:1 by weight.

Sterically hindered phenols which are known as radical traps may be used in place of or together with the aforementioned esters of trivalent phosphorus. (See Ullmanns, loc. cit., p. 257.) The sterically hindered phenols which may be used in accordance with the invention usually contain a phenyl group with at least one and not more than two tertiary groups in a postion ortho or para to the OH group and may have further optional substituents on the phenyl group, the sum of the carbon atoms of all substituents on the phenyl group being not less than nine.

Some of these compounds can be represented by the formula

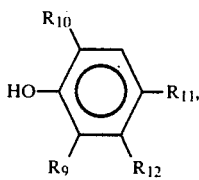

wherein $R_9$, $R_{10}$ and $R_{11}$ represent hydrogen or a sterically hindering group such as tert-butyl- or 1-methylcyclohexyl, subject to the condition that not more than two of these groups cause steric hindrance, and $R_{12}$ represents hydrogen or methyl. Alternatively, one of the two groups $R_{10}$ and $R_{11}$ represents a bridge or a spacer, A, on which at least one further phenol group

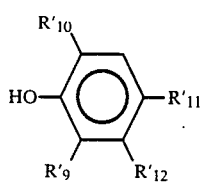

is located, wherein the substituents $R_9'$ and $R_{12}'$ have the same meanings as $R_9$ and $R_{12}$ and one of the two symbols $R_{10}'$ and $R_{11}'$ represents the site of bonding to A while the other is identical with $R_{10}$ or $R_{11}$. Still further, $R_{11}$ may represent a —$(CH_2)_n COOR_{13}$ group wherein n is 1, 2 or 3 and $R_{13}$ is a longchain and preferably $C_9$–$C_{22}$ alkyl group, or $R_{11}$ is

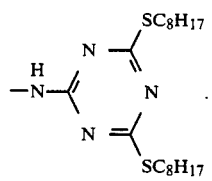

The bridge or spacer A may be a sulfur bridge, for example, or

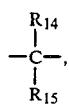

wherein $R_{14}$ represents hydrogen or methyl and $R_{15}$ represents hydrogen or alkyl having from 1 to 5 carbon atoms which may be substituted by a phenol group with sterically hindering groups, or A may be

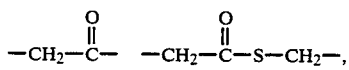

or

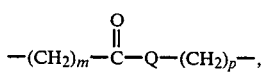

wherein m and p are integers from 1 to 4 and Q is —O— or —NH. A may be

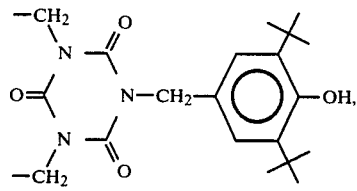

or

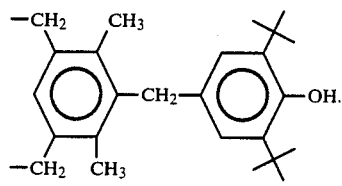

Finally, four

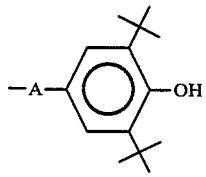

may be bonded to a central carbon atom. A preferably is

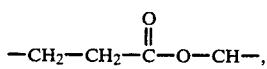

The amount of esters of triply bonded phosphorus or of sterically hindered phenols ranges from 0.05 to 2 percent, and preferably from 0.3 to 1 percent, by weight of the molding compound. When esters of triply bonded phosphorus and sterically hindered phenols are both present at the same time, as in a preferred embodiment, the first component should be present in an amount ranging from 0.05 to 2 weight percent, and preferably from 0.3 to 1 weight percent, the second from 0.01 to 0.3 weight percent and preferably from 0.05 to 0.1 weight percent.

The flame retardant molding compounds can be prepared much like those of the prior art.

As pointed out earlier, the molding compounds suited for use as basic polymers are methyl methacrylate homopolymers or copolymers with a high proportion of methyl methacrylate, usually over 80 and preferably over 90 weight percent of MMA. They may contain minor amounts of $C_1$ to $C_4$ alkyl acrylates as comonomers to improve their flow properties, for example in thermoplastic processing. In special cases, copolymerization with other vinyl compounds such as styrene or its derivatives, for example para-methylstyrene or vinyl esters or ethers, is possible.

Since the flame retardants added in accordance with the invention usually lower the melt viscosity, the addition of plasticizing monomers should be kept to a minimum (under 10 weight percent) to assure adequate heat resistance.

The flame retardant molding compounds described may be produced by any of the polymerization techniques used in the manufacture of conventional molding compounds. Foremost among these are bulk polymerization, either batch or continuous (Winnacker-Küchler, "Chemische Technologie", vol. 6, *Organische Technologie* II, p. 414, Carl Hanser Verlag, 1982), and suspension polymerization (Schildknecht/Skeist, "Polymerization Processes", volume 29 of "High Polymers", Wiley-Interscience, 1977, p. 133).

The initiators used are azo compounds (prototype azoisobutyronitrile) or organic peroxides such as diacyl peroxides or peresters (but not peroxydicarbonates because of their reactivity toward mercaptans and thioethers). The type and amount of initiator to be used essentially depend on the polymerization method chosen. As a rule, the amount will be between 0.01 and 1 weight percent, based on the total monomers. To control the molecular weight, mercaptans such as alkyl mercaptans or esters of thioglycolic acid or mercapto-propionic acid with mono- or poly-functional alcohols are used, as in all PMMA molding compounds, in amounts ranging from 0.1 to 1 percent, and usually from 0.2 to 0.5 percent. The slip or release agents employed are the commonly used longer chain alcohols, esters, or carboxylic acids, for example, stearyl alcohol or stearic acid. With regard to other additives such as antioxidants, UV absorbers, etc., the flame retardant PMMA molding compounds also impose no particular restrictions.

As a rule, the polymerization aids are dissolved in the monomers before the start of polymerization. Stabilizing additives may also be admixed with the finished polymer. The flame retardant substances may be added at any time, in other words before, during, or after polymerization. They are best added after polymerization when, as is the case with many continuous processes, a monomer-containing polymer melt is obtained which is deaerated under vacuum in a screw evaporator further in the line, or when the polymer obtained is granulated in an extruder.

In addition to possessing all essential advantageous properties of molding compounds, the flame retardant molding compounds of the invention are distinguished by a particularly favorable burning behavior. They can be processed in normally equipped processing machines for extended periods of time without problems of any kind. For example, no corrosion damage will be encountered. The light transmittance (determined in conformity with DIN 5036) is substantially the same as that of the basic polymers. The degree of yellowing (DIN 6167) and the optical quality of these molding compounds also correspond to those of the basic polymers.

The molding compounds also possess the resistance to outdoor weathering required of glazing materials. Thus, their overall properties have remained practically unchanged after weather testing in a Xeno test apparatus (in conformity with DIN 53387) for (at present) 5,000 hours. This of course is true also of outdoor weathering for more than one year.

The good properties of the flame retardant molding compounds of the invention are manifest in a marked increase in the Low Oxygen Index (LOI) in conformity with ASTM 2863 in comparison with that of the same molding compound not incorporating flame retardants. (Unmodified PMMA has a LOI of 17.2.)

The properties of these flame retardant molding compounds will now be discussed with reference to materials prepared in accordance with the Examples which follow.

In the test for normal flammability, these materials are rated B2 in conformity with DIN 4102 as they are self-extinguishing before reaching the test mark.

In the burning test in conformity with DIN 53438, they are rated K1 and F1, whereas materials to which flame retardance has not been imparted are assigned to classes K2 and F2. In the case of large area glazings, the flame propagation rate with higher incendiary loads is an important factor.

In the small-tunnel flame-spread test (which is similar to ASTM E84, Steiner tunnel), the molding compounds of the invention exhibit a lower flame propagation rate than does the unmodified material.

Their good processability makes them suitable for use in the production by extrusion of semimanufactures of even complicated geometry, for example, double- and triple-wall panels.

The Examples which follow serve to illustrate the invention. All parts and percentages are parts and percentages by weight unless otherwise noted.

EXAMPLE 1

A molding compound is prepared from a mixture of
88.54 parts of methyl methacrylate,
1 part of methyl acrylate,
10 parts of tris(2-chloroethyl)phosphate,
0.05 part of dilauroyl peroxide,
0.31 part of 2-ethylhexyl thioglycolate, and
0.1 part of stearic acid
by polymerizing in a foil bag for 3 hours at 65° C. and then for 20 hours at 55° C. and for 10 hours at 110° C. The molding compound, whose average molecular weight was $1.7 \times 10^5$, was then comminuted, mixed with 0.5 percent by weight of

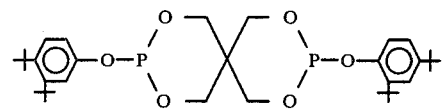

and 0.1 percent of octadecyl-3-(3,5-di-tert.butyl-4-hydroxyphenyl)-propionate as an antioxidant and stabilizer, and homogenized and granulated in a vented extruder.

The granules of uniform size so obtained were used to produce 3 mm flat plates and double-wall panels (colorless and transparent). No problems such as deposits, corrosion, or discoloration were encountered in processing.

Properties of the plates:
Impact strength: 11 kilojoules/meter$^2$
Notched-bar impact strength: 1.0 kJ/m$^2$
Both were determined in conformity with DIN 53453 and the values corresponded to those of pure PMMA.
Vicat softening temperature (DIN 53460): 93° C.
Water absorption (saturation value) (DIN 53495): 1.9%
Light transmittance (DIN 5036): 91.7%
Degree of yellowing (DIN 6167): 0.4

EXAMPLE 2

A mixture of
83.45 parts of methyl methacrylate,
6.0 parts of methyl acrylate
10.0 parts of tris(2-chloroethyl)phosphate,
0.05 part of dilauroyl peroxide,
0.1 part of cetyl alcohol, and 0.4 part of n-dodecylmercaptan was polymerized as Example 1. The molding compound, whose average molecular weight was $1.2 \times 10^5$, was then comminuted, mixed with 0.3 wt. percent by weight of

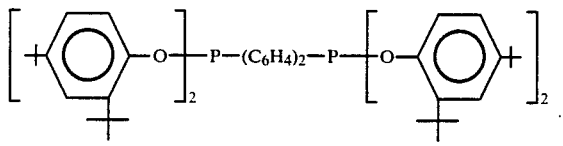

and 0.05 percent of the propionate stabilizer of Example 1, and homogenized and granulated in a vented extruder. The granules of uniform size so obtained were used to extrude 3 mm flat plates. Their properties corresponded to those of the material prepared in Example 1, except for the Vicat softening temperature, which here was 83° C. However, the material was assigned the rating B1 in the burning test in conformity with DIN 4102.

EXAMPLE 3

A mixture of
84.15 parts of methyl methacrylate,
2.0 parts of ethyl acrylate,
2.0 parts of styrene,
10.0 parts of tris(2-chloroethyl)phosphate,
0.03 part of tert-butyl perneodecanoate,
0.02 part of tert-butyl peroctoate,
0.3 part of ethylhexyl thioglycolate, and
1.5 parts of chloromethanephosphonic acid diisopropyl ester was polymerized as in Example 1.

The molding compound had an average molecular weight of $1.6 \times 10^5$. It was comminuted, mixed with 0.5 percent by weight of

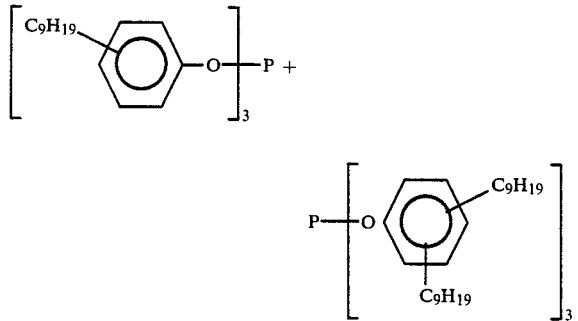

and homogenized and granulated in a vented extruder. The Vicat softening temperature was 88° C. The processing and the burning characteristics corresponded to those of the material prepared according to Example 1. In the small-tunnel flame-spread test, the material of this Example exhibited a lower flame propagation rate than the material of Example 1.

EXAMPLES 4-6

Methyl methacrylate was polymerized in a foil bag together with the following additives (in percent by weight of the methyl methacrylate) for 20 hours at 40° C. and subsequently for 10 hours at 100° C.:
0.10 percent of butyl perneodecanoate,
0.05 percent of tert.butyl peroctoate,
0.31 percent of ethylhexyl thioglycolate, and
0.10 percent of stearic acid, and
a chloroalkyl phosphoric acid ester according to the invention.

A different chloroalkyl phosphoric acid was used in each Example, as follows:
Example 4—11.4 percent of tris-(beta-chloroisopropyl)phosphate,
Example 5—10.0 percent of tris-(beta,beta'-dichloroisopropyl)phosphate, and
Example 6—15.0 percent of tris-(beta,beta'-dichloroisopropyl)phosphate.

The viscosimetrically determined molecular weights are $17(10^5)$ for Example 4, $1.6(10^5)$ for Example 5, and $1.5(10^5)$ for Example 7.

The clear, colorless polymers were milled and the products of Examples 4 and 6 were admixed with 0.75 percent of di-(2,4-di-tertbutylphenyl)pentaerythritediphosphate

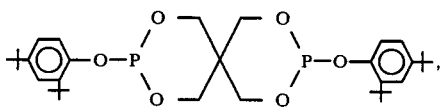

and 0.05 percent by weight of octadecyl-3-(3,5-di-tert-.butyl-4-hydroxyphenyl)propionate ("Irganox 1076"). The products so obtained were granulated in a degassing extruder.

The resulting uniform granulate was formed into flat 3 mm plates by extrusion, on which plates Vicat softening temperatures of 89° C., 98° C., and 88° C. were determined.

The ability of the product of Examples 4 and 6 to be worked was without problem and significantly better than that of the product of Example 5.

The small-tunnel flame-spread test consistently gave decreased flame propagation velocity. The samples prepared according to Example 6 with the highest amount of flame protective agents were selfextinguishing before reaching the last value.

What is claimed is:

1. A flame-retardant molding compound comprising a polymer of methyl methacrylate having an average molecular weight between $1 \times 10^5$ and $2 \times 10^5$, from 8 to 15 percent by weight of a first additive which is at least one chloroalkylphosphoric acid ester of the formula

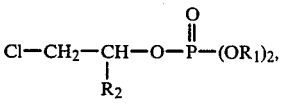

wherein $R_1$ is alkyl having from 1 to 4 carbon atoms or

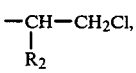

and $R_2$ is hydrogen, methyl, ethyl, or chloro-substituted methyl or ethyl, and from 0.05 to 2 percent by weight of a second additive which is a sterically hindered phenol or of an ester of trivalent phosphorus, said ester having the formula

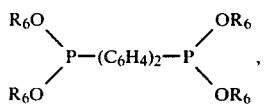

wherein $R_6$ is the same or different alkyl or alkylphenyl having 14 to 24 carbon atoms, $P(OR_7)_3$, wherein $R_7$ is the same or different alkylphenyl having 14 to 24 carbon atoms, or

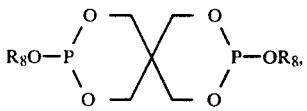

wherein $R_8$ is the same or different alkyl or alkylphenyl having 14 to 24 carbon atoms.

2. A molding compound as in claim 1 wherein said second additive is a sterically hindered phenol.

3. A molding compound as in claim 1 wherein said second additive is an ester of the formula

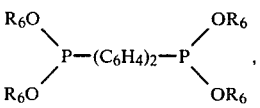

4. A molding compound as in claim 1 wherein said second additive is an ester of the formula $P(OR_7)_3$.

5. A molding compound as in claim 1 wherein said second additive is an ester of the formula

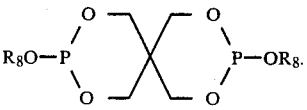

6. A flame retardant molding compound as in claim 1 wherein $R_2$ is methyl or chloromethyl.

7. A flame retardant molding compound as in claim 1 wherein $R_1$ is

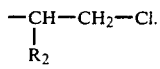

8. A flame retardant molding compound as in claim 1 which additionally comprises a compound of the formula

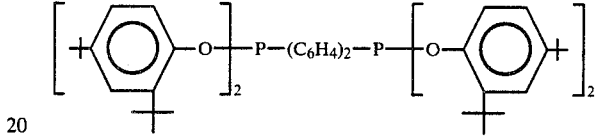

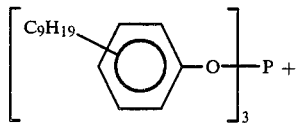

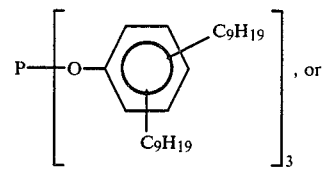, or

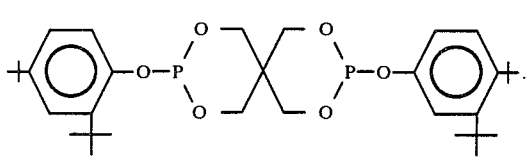

9. A flame retardant molding compound as in claim 2, wherein said sterically hindered phenol comprises a phenyl group having at least one and not more than two tertiary groups in a position ortho or para to the OH group, the sum of the carbon atoms of all substituents being not less than nine.

10. A flame retardant formed article produced by extrusion of the molding compound of claim 1.

* * * * *